March 24, 1953 R. A. SANDBERG 2,632,338
STRAIGHT PULL BRAKE LEVER ASSEMBLY
Filed March 26, 1948 2 SHEETS—SHEET 1
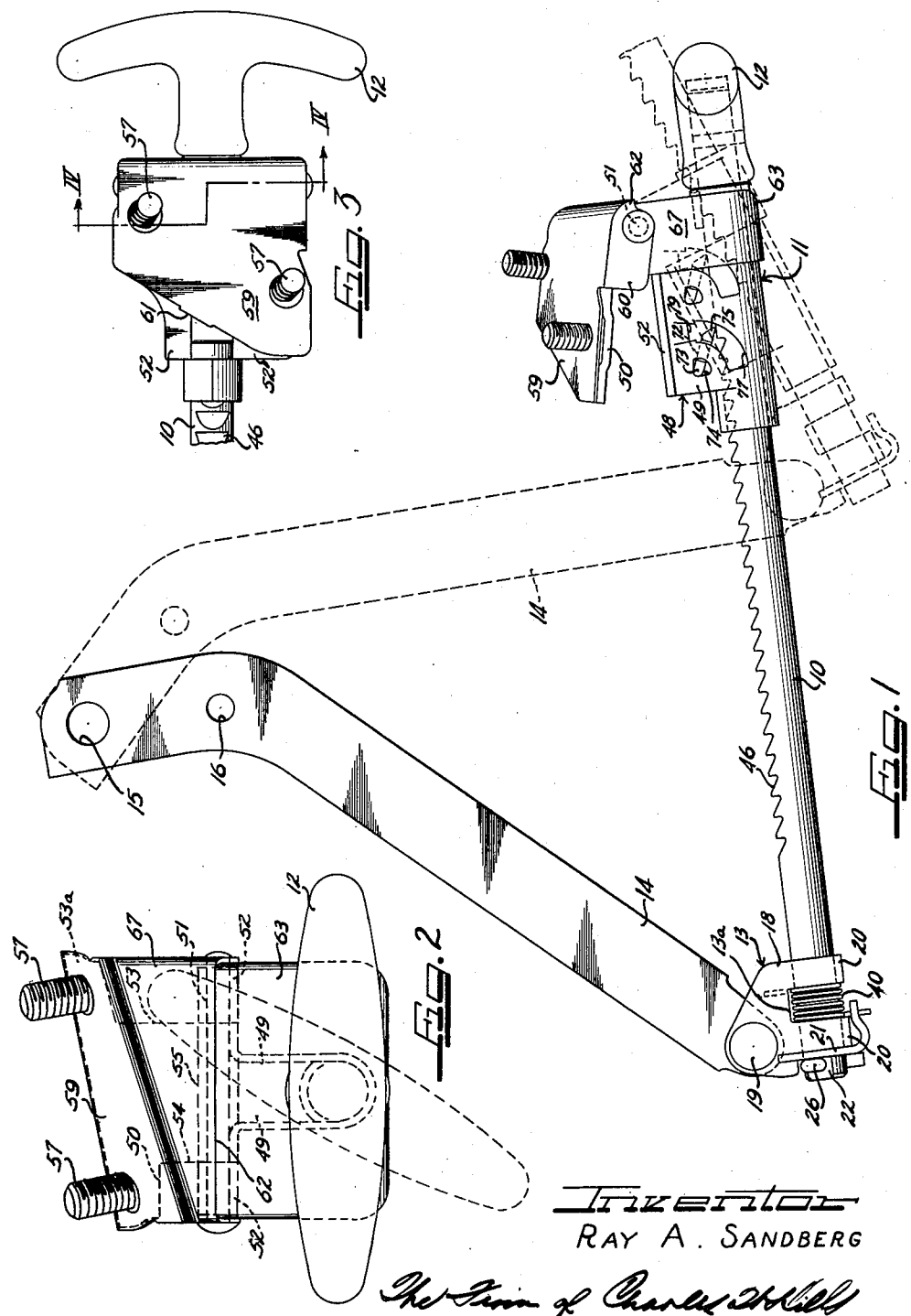
Inventor
Ray A. Sandberg
by The Firm of Charles W. Hills
Attys.

March 24, 1953  R. A. SANDBERG  2,632,338
STRAIGHT PULL BRAKE LEVER ASSEMBLY
Filed March 26, 1948  2 SHEETS—SHEET 2

Inventor
RAY A. SANDBERG
by Chas. W. Hills
Attys.

Patented Mar. 24, 1953

2,632,338

UNITED STATES PATENT OFFICE 2,632,338

STRAIGHT PULL BRAKE LEVER ASSEMBLY

Ray A. Sandberg, Waukegan, Ill., assignor to Houdaille-Hershey Corporation, North Chicago, Ill., a corporation Application March 26, 1948, Serial No. 17,183

14 Claims. (Cl. 74—503)

1

The present invention relates to improvements in brake lever assemblies and more particularly concerns an improved straight pull brake assembly adapted for use in automobiles or the like.

An important object of this invention is to provide improved means for connecting the pull rod of a straight pull brake lever assembly to the pivoted arm or lever which is connected to the braking mechanism.

A further object of this invention is to provide improved means for transmitting the thrust or load on the pull rod to the braking arm or lever.

Another object of this invention is to provide a brake lever assembly that may be quickly and easily disassembled for maintenance purposes.

Yet another object of this invention is to provide improved guiding means for reciprocable but also swingable ratchet rod for setting and releasing the associated brake.

Another object of this invention is to provide in a straight pull brake lever assembly wherein a pull rod is attached to a lever, means for permitting swinging movement of the rod in the same vertical swing plane as the lever, even though the support on which the rod support of the assembly is mounted is disposed in an oblique plane.

A still further object of this invention is to provide an improved pivotal mounting for the guiding and controlling structure for a straight pull actuating rod of a brake lever assembly.

Other objects, advantages and features of the present invention will be readily apparent from the following detailed description of a preferred embodiment thereof taken in conjunction with the accompanying two sheets of drawings wherein:

Figure 1 is a side elevational view of a brake lever assembly embodying the features of the present invention;

Figure 2 is a rear end elevational view of the brake lever assembly of Figure 1;

Figure 3 is a fragmentary plan view of the rear portion of the brake lever assembly;

Figure 4:
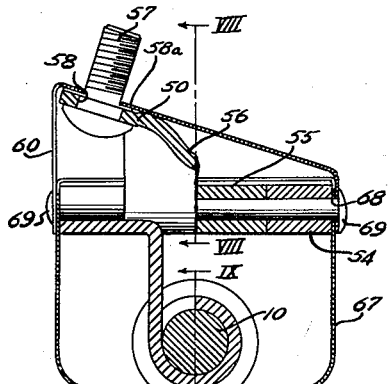
Figure 4 is a vertical sectional view taken substantially on the line IV—IV of Figure 3.

The present invention is especially concerned with improvements in the support and operative connections of a rotary and reciprocal operating rod 10 in a brake lever assembly of the straight pull type. At its rear end portion the rod 10 is carried by a guiding and controlling support structure 11. For manipulating the rod 10 it has a handle 12 at the rear end thereof. At the front end the rod is connected as by means of a clevis 13 to one end of a braking arm or lever 14. The lever 14, in one embodiment, is adapted to be pivotally mounted at one end in any preferred manner through the medium of an aperture 15 and has an aperture 16 adjacent to but spaced from such end into which the brake cable may be connected.

The clevis 13 has two parallel flange portions 18 in which the end of the lever 14 is pivotally secured, as by a rivet 19. The bight of the clevis 13 is formed with a transverse cut out 13a dividing it into two spaced axially aligned bearing portions 20 which are substantially cylindrical for receiving and journaling the forward end 22 of the pull rod 10.

Figure 10:
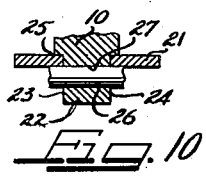
Figure 10 is a fragmentary sectional view taken substantially on the line X—X of Figure 7.
Figure 6:
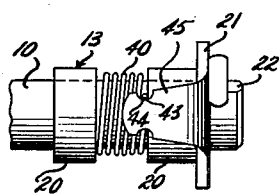
Figure 6 is a fragmentary bottom plan view of the front end portion of the brake lever assembly.

Longitudinal movement of the pull rod 10, forwardly or rearwardly, is transmitted to the clevis 13 through a thrust washer 21 which fits over the forward end portion 22 of the rod 11. As clearly shown in Figures 7 and 10, the end portion 22 of the rod has parallel flattened side faces 23 and 24 extending a short distance back from the forward extremity thereof whereby to afford a rotational coupling within the complementary angular eye of the washer 21, and providing a shoulder 25 against which the thrust washer is held removably by a suitable fastening device, such as a cotter pin 26 extending through an appropriate transverse aperture 27 forwardly of the shoulder. Thus, the thrust washer 21 is arranged to be moved forwardly or rearwardly with the pull rod 10, and, through the coupling with the flat side faces 23 and 24, the washer will also be rotated with the pull rod.

Figure 7:
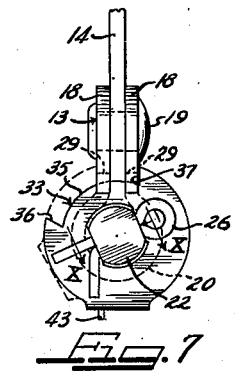
Figure 7 is a fragmentary front end elevational view of the brake lever assembly.

A thrust coupling between the washer 21 and the clevis 13 is provided by means such as integral parallel lugs 28 projecting forwardly from the respective main portions of the flanges and radially toward the clevis journal. A slot 29 is thus defined between respective rear edge faces 30 of the lugs 28 and forward edge face 31 of the flanges 18. As best seen in Figure 7, the washer 21 has an arcuate recess portion 33 extending along a portion of its periphery. This recess has an arcuate bottom wall 35 and end walls 36 and 37 arranged, upon rotation of the washer 21 to function as stop shoulders to contact opposite sides of the flanges 18 at a point directly above the slot 29 as shown in dotted lines in Figure 7. Thus, the rotation of the washer 21 and of the pull rod 10 is limited by the end walls 36 and 37 functioning as stops.

Figure 5:
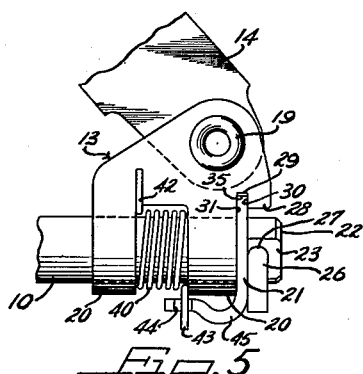
Figure 5 is a fragmentary side elevational view of the front end portion of the brake lever assembly and looking from the opposite side from that shown in Figure 1.

It is to be particularly noted, that while the rotation-limiting end walls 36 and 37 extend above the clevis slot 29, the marginal portion of the washer 21 defined by the bottom wall 35 extends into the slot, as clearly seen in Figure 5. Thus, forward movement of the pull rod 10 causes the thrust washer 21 to contact the rear faces 30 of the lugs 28 and thus transmits the forward movement to the clevis 13. Similarly, rearward movement of the pull rod will cause the thrust washer to contact the forward edge face 31 of the flanges 18 and thus transmits a rearward movement to the clevis 13.

Means for normally biasing and maintaining the pull rod 10 in one rotary position includes a torsional helical spring 40 disposed around the pull rod in the cut out 13a between the spaced cylindrical bearing portions 20 of the clevis 13. The rear end portion 42 of the spring extends radially outwardly and engages one of the clevis flanges 18, and the forward end portion 43 extends radially outwardly and engages in a notch 44 provided in a rearwardly extending integral spring anchoring and torsioning arm 45 on the thrust washer 21. This arm 45 lies in closely spaced relation to the clevis journal and partially across the cut out 13a and the spring 40 is torsionally loaded in applying the end portion 43 to the arm. The spring 40 thus functions to return the ratchet rod 10 normally to the given oscillation limit with respect to the clevis 13 as defined by the stop shoulder 37, herein to the position wherein the handle 12 of the rod extends substantially horizontally while a series of ratchet teeth 46 on the rod extend upwardly. The rod 10 may be quickly disconnected from the clevis merely by removing the cotter pin 26 and pulling the rod rearwardly.

Since in the reciprocal movement of the ratchet rod 10, the forward end thereof which is attached to the lever 14 is caused to move through an arcuate path between the brake-release full line and the maximum brake setting dash outline positions in Figure 1, the rod supporting and control structure 11 is preferably so constructed and arranged as to accommodate this movement, while at the same time remaining in a given relationship to that portion of the associated vehicle to which it is attached, such, for example, as the dash panel of an automobile. To this end, the structure 11 comprises a support member 48 which is hinged to a mounting plate or bracket 50 (Figures 1 and 8), a hinge pin 51 serving to connect the hinge plate and support member 48 together hingedly.

The support member 48 (Figure 1) preferably comprises a generally tubular sheet metal structure through which the pull rod 10 is reciprocally and rotatably movable. Intermediate its ends, the tubular member 48 is formed with a pair of upstanding wall portions 49 which are provided at their upper margins with respective oppositely extending coplanar wing flanges 52. These flanges 52 have aligned hinge curls or journals 54 at their rearward ends for receiving the hinge pin 51 (Figure 2).

The mounting bracket 50 is formed at its rear edge with a centered hinge curl or journal 55, which is of a length to extend coaxially between the hinge curls 54 for connection hingedly by means of the hinge pin 51. A flange 53 extends upwardly from the curl 55 to connect it to a slanted upper bracket surface 53a. A reinforcing offset formation 56 may extend between the flange 52 and the surface 53. The surface 53a has preferably square apertures 58 for receiving square shoulders on the shanks of attaching bolts 57 by which the assembly is adapted to be secured to the under-turned lower portion of the dash panel. Peened shoulder flanges 58a cooperate with the bolt heads for maintaining the bolts in permanent assembly with the plate 50.

Figure 8:
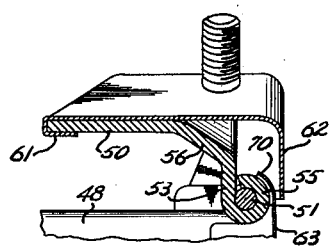
Figure 8 is a fragmentary vertical sectional view taken substantially on the line VIII—VIII of Figure 4.

As best seen in Figures 1 and 3, a trim plate 59 is secured on the mounting bracket 50, having side walls 60 that enclose the bracket and receive therethrough the hinge pin 51. At its forward edge a downwardly and reversely turned flange 61, Figures 3 and 8, is arranged to hook around the forward end of the mounting bracket 50. At the rearward marginal portion of plate 59 a flange or skirt 62 overhangs the hinge joint.

It is a particular feature of this invention that the pull rod is mounted for pivoting in a substantially vertical plane even though the portion of the dash panel to which it is attached has a sloping oblique abutment face. This is accomplished by sloping the dash panel contacting face of the mounting bracket 50 at the same angle as the abutment face of the dash panel, while maintaining the pivotal axis of the pull rod mount, as afforded by the hinge joint between the mounting bracket and the support member 48, in a plane normal to the plane in which the pull rod swings. Thus, it is seen in Figure 2, that the upper surface of the mounting bracket 50 slopes downwardly to the left relative to a horizontal plane through the hinge pin 51.

Figure 9:
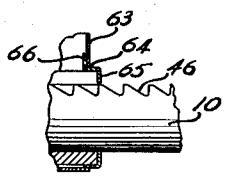
Figure 9 is a fragmentary vertical sectional view taken substantially on the line IX—IX of Figure 4.

A finishing plate 63 is preferably secured to the rear end of the housing structure 11, having the main body portion thereof formed with an aperture 64 which, in assembly, registers with the rod guiding tube passages in the housing 48. A ring-like trim plate 65 (Figure 9) is pressed into the aperture 64 and has a substantially annular flange 66 which abuts the inner wall of the plate 63.

Forwardly turned side flanges 67 of the plate 63 engage the outer ends of the hinge journals 54 and have respective holes 68 (Figure 4) therethrough registering with the hinge pin bores of the hinge structure so that the opposite ends of the hinge pin 51 may extend therethrough and also through the side walls 60 of the upper trim plate 59. Rivet heads 69, or the like, on the hinge pin engage the outer sides of the side flanges 67 retainingly.

At the extreme upper end of the finishing plate 63, a flange 70 is formed on a radius with the hinge pin as center to partially enclose the hinge joint as seen in Figure 8. It is to be noted that regardless of the angle of the brake lever there will always be a clearance between the mounting bracket 50 and the plate 63.

Incremental brake setting is effected by means of pawls 72 which are carried by the support structure 48 between the upstanding wall portions 49 and are engageable with the ratchet teeth 46 of the pull rod 10. Herein, the pawl members 72 are in the form of flat generally knife-edge plate-like elements having coaxial oppositely extending pivot arms 73 at the sides thereof and operatively engage through respective pivotal openings 74 in the wall members while outer arms 75 at the opposite or rear portions of the pawl members work through respective arcuate slots 77 in the wall members. If desired, biasing torsion springs, not shown, may be provided for biasing the pawls 72 positively into engagement with the ratchet teeth 46, the walls 49 being provided with appropriate tensioning lugs 79 at the upper end of the arcuate clearance slots 77. For a more comprehensive disclosure of the particular pawl and ratchet arrangement utilized herein, reference may be had to my copending application Serial No. 779,183, filed October 10, 1947, now Patent No. 2,543,509, dated February 27, 1951.

In the operation of the brake lever assembly, the handle 12 is grasped when the brake is to be set and the pull rod 10 drawn rearwardly, thereby rocking the lever 14 and swinging the forward end of the rod 10 downwardly as it moves rearwardly. Accommodating this action of the pull rod 10, the supporting and guide housing 48 swings hingedly about its pivot rod 51, and the pawls 72 ratchet over the teeth 46 until the appropriate setting pressure has been applied, in which condition the pawls retain the rod 10. To release the brake the handle 12 is turned, in the present instance counterclockwise in opposition to the return spring 40, until the ratchet teeth 46 clear the pawls 72, whereupon the pull rod 10 will slide forwardly, generally under the tension of the brake cable or cables.

From the foregoing description it is evident that there is provided by this invention improved means for transmitting the pull or load on the pull rod to the braking lever through an improved clevis and thrust washer assembly. This new type assembly provides an adequate amount of thrust surface for carrying out this operation while permitting the parts to move relative to each other without binding.

The novel method of mounting the spring about the forward end of the pull rod provides a positive means for returning the rod to its normal operating position although no holes are drilled in the rod itself.

Also, there is provided by this invention a novel type of mounting device wherein the brake lever assembly may be mounted in an operative position and hinged from a dash panel even though the abutment surface of the dash panel is disposed in a plane oblique to the plane in which the brake lever and pull rod swing.

For structure disclosed herein but not claimed reference is made to my copending application Serial No. 789,885, filed December 5, 1947.

It will, of course, be understood that various details of construction may be varied through a wide range without departing from the principles of this invention and it is, therefore, not the purpose to limit the patent granted hereon, otherwise than necessitated by the scope of the appended claims.

I claim as my invention:

1. In combination in a brake lever assembly for connection to a brake actuating lever, a guide housing, a pull rod mounted for reciprocation in said housing, a clevis connected to the brake actuating lever, a thrust washer disposed about said pull rod and movable longitudinally therewith, said clevis having a slot for receiving a portion of said thrust washer for transmitting the movement of said pull rod to the brake actuating lever.

2. In combination in a brake lever assembly for connection to a brake actuating lever, a guide housing, a pull rod mounted for reciprocation in said housing, a clevis connected to the brake actuating lever and having guide portions for receiving said pull rod for sliding reciprocable movement therein, said clevis having a slot intermediate its ends and laterally disposed relative to said pull rod, a fastening means on said pull rod forwardly of said clevis, and a thrust washer disposed on said pull rod between said clevis and said fastening means and having a marginal portion projecting into said slot.

3. In combination in a brake lever assembly for connection to a brake actuating lever, a guide housing, a pull rod movable in said guide housing, a clevis connected to the brake actuating lever having forward and rearward guide portions arranged to receive said pull rod for sliding therein, a fastening means on said pull rod forwardly of said clevis, spaced abutment shoulders on said clevis, a thrust washer disposed on said pull rod for longitudinal movement therewith and poitioned between said clevis and said fastening means and having a portion thereof disposed between said abutment shoulders for transmitting the movement of said pull rod to said brake actuating lever.

4. In combination in a brake lever assembly for connection to a brake actuating lever, a guide housing, a pull rod movable for reciprocation and rotation in said guide housing, a clevis connected to the brake actuating lever having spaced abutment walls disposed laterally of said pull rod and spaced guide portions for receiving said pull rod, a thrust washer connecting the clevis and rod disposed on said pull rod for reciprocable and rotary movements therewith, and a torsion spring disposed about said pull rod between said spaced guide portions having one end anchored on said clevis and the other end anchored on said thrust washer for biasing said pull rod normally in one rotary direction.

5. In combination in a brake lever assembly for connection to a brake actuating lever, a guide housing, a pull rod movable for reciprocation and rotation in said housing, a clevis connected to the brake actuating lever having spaced guide portions for receiving said pull rod, a thrust washer disposed on said pull rod having an arm portion extending therealong, and a spring between said spaced guide portions having one end anchored on said clevis and the other end anchored on the arm portion of said thrust washer for biasing said pull rod normally in one direction.

6. In combination in a brake actuating device, a pull rod adapted for actuating a brake lever, means for guiding the pull rod, a clevis at the forward end of the pull rod for connection to the lever, and a thrust washer effecting a thrust connection between the clevis and the rod, the clevis having abutments interengaging with the thrust washer for maintaining thrust connection between the washer and the clevis in opposite thrust directions, and abutment means on the rod effecting interconnection at opposite sides of the washer effecting thrust connection between the rod and the washer for opposite thrusting of the pull rod against the washer and thus transmitting the motion of the rod to the clevis.

7. In combination in a brake lever assembly of the character described, a pull rod, a clevis for attaching the rod operatively to the brake actuating lever and mounted at the forward end portion of the rod, the forward extremity of the rod extending forwardly beyond the clevis, and a thrust washer mounted on said forward extremity of the rod and having reciprocal thrust connection with the clevis, the rod having a thrust shoulder engaging the rear side of the washer and carrying removable thrust means at the forward side of the thrust washer.

8. In combination in a brake actuating mechanism of the character described, a reciprocable and rotary pull rod, a clevis carried at the forward end portion of the rod and adapted for attachment to a brake actuating lever, a thrust washer operatively interconnecting the clevis and pull rod for reciprocal movements, the thrust washer and the rod being interconnected for joint rotary movement, the thrust washer having peripherally spaced shoulders alternately interengageable with a portion of the clevis for limiting rotary movements of the rod relative to the clevis, and a torsion spring carried by the rod and having the respective opposite ends connected to respectively the clevis and the thrust washer and normally biasing the rod through the thrust washer in one rotary direction to one of the rotary limits defined by one of said limiting shoulders.

9. In combination in a brake actuating assembly of the character described, a pull rod, a supporting and guiding member carrying the pull rod, a mounting plate having a portion thereof adapted to be secured to a support, said plate having an angular portion with the free edge thereof disposed in a plane diagonal to the general plane of the support-attachable portion of the plate, and means pivotally connecting said supporting and guiding member to said diagonal edge, whereby said pull rod is swingable about the axis of said pivotal connection in a plane normal to said axis and diagonally related to said attachable portion of said plate.

10. In combination in a brake actuating mechanism of the character described, a hinge plate having the rear edge thereof formed into a hinge journal, a pull rod, a guiding and supporting member for said pull rod having hinge journal means thereon, a hinge pin connecting said hinge journal means of said member and of said hinge plate, and a plate carried by said hinge plate and extending rearwardly into concealing relation to said hinge journals.

11. In combination in a brake actuating assembly of the character described, a pull rod, a supporting and guiding member carrying the pull rod, a mounting plate having a portion thereof adapted to be secured to a support, said plate having an angular portion with the free edge thereof disposed in a plane diagonal to the general plane of the support-attachable portion of the plate, means pivotally connecting said supporting and guiding member to said diagonal edge, whereby said pull rod is swingable about the axis of said pivotal connection in a plane normal to said axis and diagonally related to said attachable portion of said plate, and a finishing plate carried by said mounting plate and having a portion concealingly related to the angular portion of the mounting plate.

12. In combination in a brake actuating assembly of the character described, a pull rod, a supporting and guiding member carrying the pull rod, a mounting bracket having a portion thereof adapted to be secured to a support, said bracket and said member being pivotally secured at the outside of said member and in a location which would normally be exposed at the rear of the assembly adjacent to the rear end portion of the pull rod, a finishing plate carried by the supporting and guiding member, and a finishing plate carried by said bracket, said finishing plates having marginal portions thereof generally overlappingly related in finishing, concealing relation to said pivotal connection.

13. In combination in a brake actuating assembly of the character described, a pull rod, a supporting and guiding member carrying the pull rod, the pull rod having a handle at its rear end, a bracket for supporting the supporting and guiding member, means providing a pivotal connection between the supporting and guiding member and said bracket, a separately formed finishing plate attached to the rear of said supporting and guiding member and having an aperture therethrough for passage of the pull rod, and a finishing ring plate secured in said aperture about the pull rod.

14. In combination in a brake actuating mechanism of the character described, a reciprocable and rotary pull rod, a clevis engaging relatively rotatably about an end portion of the pull rod and adapted for connection to a brake actuating lever, a spring for imparting a rotary torque to the pull rod relative to the clevis and having one end connected to the clevis and having at the opposite end a finger-like portion extending therefrom, and a thrust washer carried by the rod and connected to rotate therewith, said rod having means retaining the washer against longitudinal displacement on the rod, said washer being disposed in longitudinal thrust relation to the clevis, said washer having an arm projecting therefrom and intersectingly engaging said finger-like end portion of the spring for normally receiving a torque thrust from the spring tending to drive the rod in one rotary direction.

RAY A. SANDBERG.

REFERENCES CITED

The following references are of record in the file of this patent:

UNITED STATES PATENTS

| Number | Name | Date |
|---|---|---|
| 1,818,031 | Baits | Aug. 11, 1931 |
| 2,172,793 | Johnson | Sept. 12, 1939 |
| 2,274,133 | Fergueson | Feb. 24, 1942 |
| 2,295,792 | Jandus | Sept. 15, 1942 |
| 2,304,356 | Heller | Dec. 8, 1942 |
| 2,377,691 | Jandus | June 5, 1945 |
| 2,406,073 | Griswold | Aug. 20, 1946 |
| 2,429,224 | Fergueson | Oct. 21, 1947 |